United States Patent
Baker et al.

(10) Patent No.: US 8,415,914 B2
(45) Date of Patent: Apr. 9, 2013

(54) MOTOR DRIVE LOAD DAMPING

(75) Inventors: Donal E. Baker, Rockford, IL (US); Raymond J. Beckmann, Genoa, IL (US); Curtis J. Plude, Belvidere, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 543 days.

(21) Appl. No.: 12/686,616

(22) Filed: Jan. 13, 2010

(65) Prior Publication Data

US 2011/0169443 A1  Jul. 14, 2011

(51) Int. Cl.
*G05B 5/01* (2006.01)

(52) U.S. Cl.
USPC .............................. 318/611; 318/702; 318/801

(58) Field of Classification Search .................. 318/140, 318/611, 146, 153, 114, 727, 801, 702; 322/19, 322/13, 44; 174/42; 324/618, 125; 335/105; 367/162; 369/246
See application file for complete search history.

(56) References Cited

U.S. PATENT DOCUMENTS

| | | | |
|---|---|---|---|
| 4,377,780 A | 3/1983 | Bjorklund | |
| 4,661,897 A | 4/1987 | Pitel | |
| 4,855,664 A | 8/1989 | Lane | |
| 4,910,438 A | 3/1990 | Farnsworth | |
| 6,051,941 A * | 4/2000 | Sudhoff et al. | 318/140 |
| 6,289,919 B1 | 9/2001 | Sledd et al. | |
| 6,499,572 B2 | 12/2002 | Masamura et al. | |
| 6,896,480 B1 | 5/2005 | Hagshenas et al. | |
| 6,942,451 B1 | 9/2005 | Alexander et al. | |
| 7,042,110 B2 * | 5/2006 | Mikhail et al. | 290/44 |
| 7,173,399 B2 * | 2/2007 | Sihler et al. | 322/40 |
| 7,193,850 B2 | 3/2007 | Pal | |
| 7,423,411 B2 * | 9/2008 | Sihler | 322/19 |

* cited by examiner

*Primary Examiner* — Antony M Paul
(74) *Attorney, Agent, or Firm* — Carlson, Gaskey & Olds, PC

(57) ABSTRACT

An electric power supply system has a power bus for providing DC power, and a control unit for a source of power to supply the power bus. The power unit includes a damping algorithm to provide damping to power supplied on the power bus. A motor and a motor control include a compensation block for tapping power from the bus, and identifying a portion of a supplied signal due to the damping. The compensation block provides a signal to a summing block that addresses the damping on the power bus prior to the power being supplied to the motor. A method of utilizing such a system is also disclosed.

14 Claims, 1 Drawing Sheet

MOTOR DRIVE LOAD DAMPING

BACKGROUND OF THE INVENTION

This application relates to a damping circuit associated with a motor drive for a motor to be powered by a DC power bus.

Many electrical systems include a power bus that passes electric power among a number of components associated with the system. One example is an aircraft electrical power system. In such a system, a DC power bus supplies power to many components mounted around the aircraft.

Such systems typically include electric generators which are driven by prime movers, such as gas turbine engines, to generate AC power. A gear box is typically included between the prime mover and the generator. The AC power is converted to DC and passed to the power bus.

There are a number of torsional and vibratory challenges in such systems. Mechanical dampening systems have been incorporated, however these are complex and require a good deal of space and weight.

More recently, generator control units have been provided with damping algorithms that modulate the DC bus voltage. The bus voltage modulation, in combination with a resistive load on the bus, is used as a means of damping mechanical oscillations in the prime mover/generator system.

However, when the bus loading is not resistive, these damping algorithms are ineffective. Such is the case when a motor drive with a constant power algorithm is connected to the bus. The constant power algorithm in the motor drive makes it appear as a negative impedance load on the bus.

SUMMARY OF THE INVENTION

An electric power supply system has a power bus for providing DC power, and a control unit for a source of power to supply the power bus. The power unit includes a damping algorithm to provide damping of standing vibrations in the generator/prime mover system. A motor and a motor control include a compensation block for tapping power from the bus, and identifying a portion of a supplied signal due to the damping. The compensation block provides a signal to a summing block that addresses the damping on the power bus prior to the power being supplied to the motor. A method of utilizing such a system is also disclosed.

These and other features of the present invention can be best understood from the following specification and drawings, the following of which is a brief description.

DETAILED DESCRIPTION OF THE PREFERRED EMBODIMENT

Figure 1:
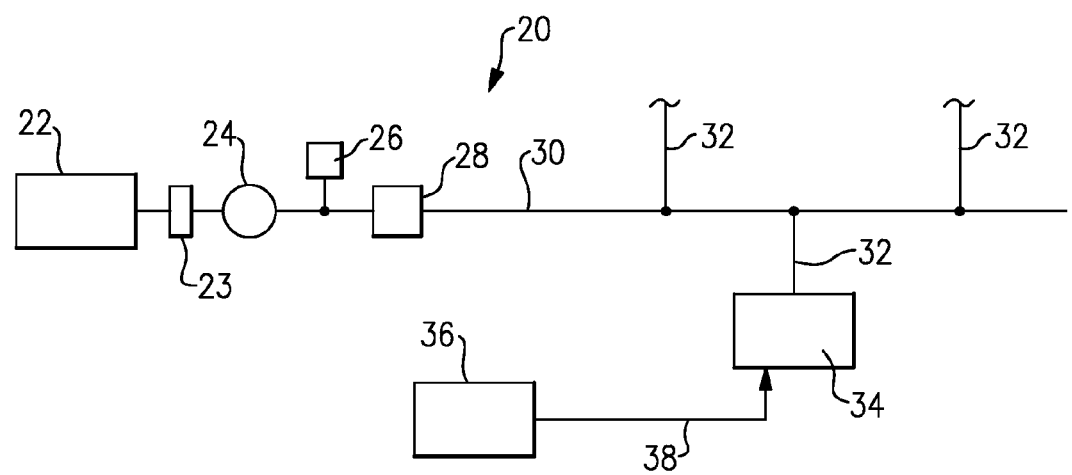
FIG. 1 schematically shows an aircraft electric system.

An electric system 20 for an aircraft is illustrated in FIG. 1. Although the invention is illustrated on an aircraft, other applications utilizing an electrical generator to supply power to a bus would benefit from this invention. A gas turbine engine 22 powers an electric generator 24 to supply AC current to an AC to DC converter 28. A gear box 23 is positioned between the engine 22 and generator 24. A generator control unit (GCU) 26 controls the AC power supply, to increase or decrease generator power output in response to changing speeds from the engine 22 to the generator 24. The generator control unit employs an active damping algorithm which uses phase compensation to effectively dampen torsional oscillation.

Downstream of the AC to DC converter 28 is a DC power bus 30. A number of components draw power through taps 32 from the bus 30. Motor controls 34 draw from the power bus through taps 32. In particular, motor controls 34 are used in applications aboard aircraft to run a variety of mechanical loads such as engine starters, hydraulic pumps, centrifugal compressors, fans, etc.

As mentioned, engine 22 generates mechanical energy that is provided through gearbox 23 to synchronous generator 24 (or to multiple synchronous generators). Generator 24 produces AC electric power that may be transmitted to a number of AC electric loads, including AC to DC and AC to AC power converters. The FIG. 1 schematic is simplified, but it should be understood that power can be delivered to more than bus 30. AC to DC converter 28 provides DC power as input to bus 30.

A shaft transmits the mechanical energy from the gearbox to the synchronous generator. Due to a multitude of competing mechanical design considerations, the shaft may be relatively long and mechanically compliant. Inertias associated with engine 22, gearbox 23, generator 24, and other gearbox driven accessories, in combination with the mechanical compliance or spring rates of the mechanical drive train, including the generator shaft, create a distributed mechanical spring-mass system that has associated torsional resonances. There are multiple torsional modes and associated resonances that involve the generators when multiple direct-driven generators are driven from a common gearbox. Engine gearboxes typically exhibit very lightly damped characteristics, and because the generator is controlled by control 26 to maintain an AC voltage at its output, it presents a near constant power load characteristic to the mechanical drive train that results in negative damping for disturbance frequencies that are within the generator's voltage regulation bandwidth. In certain situations, depending on the generator speed, the generator electrical load characteristics, and the net effective damping in the overall mechanical drive train, the torsional resonance of the spring-mass system involving the generator or generators can lead to large, undesirable torsional oscillations.

Mechanical damping may be used to offset the negative damping characteristic of the synchronous generator and thus dampen the torsional oscillations in the spring-mass system, but, as mentioned above, mechanical damping requires additional parts that increase the weight and cost of the system.

Thus, a GCU 26 is provided with an active damping algorithm to provide positive mechanical damping to the generator rotor over a limited torsional oscillation frequency range. It does this by increasing/decreasing the generator power output in response to generator speeds that are increasing/decreasing. This GCU active damping algorithm can be tuned through selective use of phase compensation to effectively dampen the aforementioned torsional oscillations for a certain class of electrical loads. As an example, resistive loads whose DC load impedance characteristics define a phase relationship between a sinusoidal input DC voltage perturbation and the corresponding sinusoidal DC current response to the DC voltage perturbation at the same frequency as the voltage perturbation can be used.

High performance motor controls 34 have a number of competing requirements including the steady state and dynamic performance requirements of the motor drive loads and the DC load impedance requirements dictated by DC source. DC load interactions determine electric power quality and electric system stability. The addition of a DC load impedance phase relationship related to the damping effectiveness of the GCU 26 active damping algorithm in the generator controls of the synchronous generator supplying the electric loads could lead to competing requirements.

Modern motor controls 34 incorporate a variety of means to modulate or control the mechanical power delivered to the motor load. These techniques include modern closed loop control for both synchronous and induction motors and simple open loop V/Hz control for induction motors, as two examples among many.

Depending on the dynamic response requirements of the motor load, the DC load impedance of these motor controls as electrical loads on the DC bus may approximate constant power or negative impedance load characteristics in the frequency range of the fundamental mechanical drive line torsional resonance frequencies, which would typically be 20 to 60 Hz. For the more active of these motor control loads, the DC load impedance phase angle may be as negative as $-135°$ at the lower limit of the aforementioned torsional resonance frequency range. As a reference a pure constant power load has a DC load impedance phase angle of $-180°$. When included as the loads that must be supplied by the generators powering the electric system, these large negative DC load impedance angles can impose severe restrictions on the effectiveness of the GCU active damping algorithms in providing positive mechanical damping to the mechanical drive line of the engine powering the synchronous generator or generators.

Figure 2:
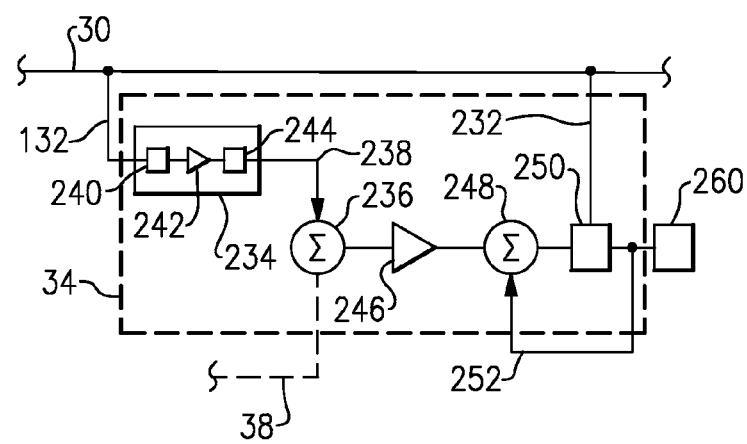
FIG. 2 shows a power circuit for powering a single motor.

An overall control for the system 36 provides a motor speed control signal 38 to the control 34. As shown in FIG. 2, control 34 includes a compensation block with additional components to compensate for the damping from the GCU 26.

The compensation block 234 in control 34 as shown in FIG. 2 actually includes two taps to the power bus 30 including a first control tap 132, and a second power tap 232, rather than the single tap 32 shown schematically in FIG. 1. The tap 132 extends to compensation block 234 which includes a band pass filter 240, a gain and compensation block 242, and a limit block 244.

Band pass filter (BPF) block 240 isolates the DC voltage disturbance caused by the torsional oscillation and the GCU active damping response. Gain & compensation block 242 converts the voltage disturbance to a motor drive control variable modulation, or a frequency modulation at the correct phase relationship to the DC voltage disturbance. Limit block 244 limits the output range of the motor drive control variable modulation.

As can be seen in FIG. 2, the signals leave the compensation block 234 and extend through connection 238 to a first summation block 236. First summation block 236 also sees the speed demand signal 38. Downstream of the first summation block 236 is an inverter VHz component 246, which extends to a second summation block 248. An inverter 250 to supply power to motor 260 is downstream, and also receives power 232 from the bus 30. As can be seen, a feedback signal 252 of the actual power supplied downstream of the inverter 250 extends back to the second summation block 248. The closed loop feedback control provided by summation block 248 may be generally as known in the art.

When the DC link voltage disturbance is positive, the frequency modulation command is positive. Conversely, when the DC link voltage disturbance is negative, the frequency modulation command is negative. The frequency modulation command is limited and then added to the controller command frequency. This controller command frequency is then fed to the motor drive V/Hz algorithm controlling the inverter.

It is recognized by one skilled in the motor drive art that the V/Hz example described above is but one of many implementations. In the V/Hz example the inverter frequency has a strong, direct influence on the induction motor torque and thus power. An instantaneous increase in inverter frequency produces a near instantaneous increase in motor torque and thus power. For a high bandwidth vector control motor drive, the variable relating to the motor torque and power is the torque producing current component or q-axis current in the vernacular. For a low bandwidth vector control motor drive controlling a synchronous motor, the phase angle of the current relative to the rotor position plays the equivalent role to the inverter frequency. Thus for the many possible motor drive implementations and/or types, the algorithm will include function blocks 240, 242, and 242, although it is possible that an algorithm that omits one or more of the blocks could come within the scope of this application.

Relative to these functions, the motor drive control variable signal is the inverter frequency for a V/Hz controlled induction motor, the torque producing current for a high bandwidth vector control and the phase angle of the current vector relative to the motor rotor in a low bandwidth vector control.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. An electric power supply system comprising:
a power bus for providing DC power, and a control unit for a source of power being supplied to said power bus, said control unit including a damping algorithm to provide damping to power supplied on the power bus; and
a motor, and a motor control including a compensation block for tapping power from said power bus, and identifying a portion of a supplied signal due to said damping, said compensation block providing a compensation signal that compensates for the damping on the power bus prior to the power being supplied to said motor.

2. The system as set forth in claim 1, wherein said compensation block includes a band pass filter that isolates a voltage modulation signal on said power bus caused by the damping.

3. The system as set forth in claim 2, wherein a gain and compensation block is positioned downstream of said band pass filter, and converts an identified voltage modulation signal to a frequency modulation at a correct phase relationship to the voltage modulation on the power bus.

4. The system as set forth in claim 3, wherein a limit block is positioned downstream of said gain and compensation block, with said limit block limiting an output range of the frequency modulation.

5. The system as set forth in claim 2, wherein said compensation signal extends to a first summation block along with a speed signal, and a resulting control signal passes downstream to an inverter for controlling said motor.

6. The system as set forth in claim 5, wherein said inverter also receives power from said power bus.

7. The system as set forth in claim 6, wherein a feedback signal returns a feedback of a power supply being sent to said motor to a second summation block, and said second summation block is positioned downstream of said first summation block.

8. A method of operating an electric power supply system comprising the steps of:

providing DC power on a power bus and including a damping algorithm to provide damping to power supplied on the power bus; and tapping power from said power bus, and identifying a portion of a supplied signal due to said damping, and providing a compensation signal that compensates for the damping on the power bus prior to the power being supplied to a motor.

9. The method as set forth in claim 8, including the step of isolating a voltage modulation on said power bus caused by the damping.

10. The method as set forth in claim 9, including the step of converting an identified voltage modulation signal to a frequency modulation at a correct phase relationship to the voltage modulation on the power bus.

11. The method as set forth in claim 10, including the step of limiting an output range of the frequency modulation.

12. The method as set forth in claim 11, including the step of sending the compensation signal to a first summation block along with a speed signal, and a resulting control signal passing downstream to an inverter for controlling said motor.

13. The method as set forth in claim 12, including the step of said inverter also receiving a power supply.

14. The method as set forth in claim 13, including the step of returning feedback of a power supply being sent to a motor to a second summation block.

* * * * *